US006041328A

United States Patent [19]

Yu

[11] Patent Number: 6,041,328

[45] Date of Patent: Mar. 21, 2000

[54] TRACKING AVAILABILITY OF ELEMENTS WITHIN A SHARED LIST OF ELEMENTS FROM AN INDEX AND COUNT MECHANISM

[75] Inventor: Ching Yu, Santa Clara, Calif.

[73] Assignee: Advanced Micro Devices, Inc., Sunnyvale, Calif.

[21] Appl. No.: 08/992,619

[22] Filed: Dec. 17, 1997

[51] Int. Cl.[7] ..................... G06F 17/30

[52] U.S. Cl. ..................... 707/10; 711/110; 711/109; 710/52

[58] Field of Search ..................... 711/110, 109; 710/52; 707/10

[56] References Cited

U.S. PATENT DOCUMENTS

| | | | |
|---|---|---|---|
| 3,331,954 | 7/1967 | Kinzie et al. | 711/110 |
| 4,694,419 | 9/1987 | Okamoto et al. | 364/900 |
| 4,800,524 | 1/1989 | Roesgen | 364/900 |
| 4,811,397 | 3/1989 | Nakajima | 381/36 |
| 5,297,207 | 3/1994 | Degele | 380/46 |
| 5,345,588 | 9/1994 | Greenwood et al. | 395/650 |
| 5,394,519 | 2/1995 | Bodin | 395/131 |
| 5,623,621 | 4/1997 | Garde | 395/421.1 |
| 5,687,173 | 11/1997 | Melden et al. | 370/395 |

*Primary Examiner*—Paul R. Lintz
*Assistant Examiner*—Frantz Coby
*Attorney, Agent, or Firm*—Monica H. Choi

[57] ABSTRACT

The present invention keeps track of available elements in a list of elements available to a given device for processing from an index and count mechanism. Such an index and count mechanism provides an index that indicates a starting element in the list of elements that is available to the given device for processing. Such an index and count mechanism also provides a count that indicates a subsequent number of elements, from the starting element in the list of elements, that are available to the given device for processing. A first index register and a second index register alternately keep track of a last available element in the list of elements available to be processed by the given device until the last available element is a very last element in the list of elements. In addition, the first index register and the second index register also alternately keep track of a current element, in the list of elements, that is currently being processed by the given device until the very last element in the list of elements has been processed by the given device. By thus alternating between the first and second index registers for keeping track of the last available element and by thus alternating between the first and second index registers for keeping track of the currently processed element, processing through multiple cycles of the list of elements may be kept track of in a simple manner. The present invention may be used to particular advantage when the given device is a computer network peripheral device that processes descriptors within a shared memory of a host computer system.

12 Claims, 3 Drawing Sheets

TRACKING AVAILABILITY OF ELEMENTS WITHIN A SHARED LIST OF ELEMENTS FROM AN INDEX AND COUNT MECHANISM

TECHNICAL FIELD

This invention relates to interaction between electronic devices, and more particularly, to tracking availability of elements from a list of elements for a given electronic device during processing through the list of elements from an index and count mechanism.

BACKGROUND OF THE INVENTION

The present invention will be described with an example application for an Ethernet computer network peripheral device which couples a host computer system to a network of computers. In this example application, a CPU of the host computer system and the Ethernet computer network peripheral device share access to a shared memory within the host computer system. However, from this example application, it should be appreciated by one of ordinary skill in the art of electronic systems design that the present invention may be practiced for other applications requiring tracking of processing of elements from a list of elements that is shared for access between multiple electronic devices.

In particular, the present invention is described with respect to a list of descriptors that are shared for access between the CPU and the computer network peripheral device as described herein. However, from this example application, it should be appreciated by one of ordinary skill in the art of electronic systems design that the present invention may be practiced for any list of any type of elements that are processed, aside from just the example of a list of descriptors.

Referring to FIG. 1, a computer peripheral device 102 may be an Ethernet computer network peripheral device which allows a host computer 104 to communicate with other computers within a network of computers 106. Such a computer peripheral device 102 receives and transmits data packets on the network of computers 106. The computer peripheral device 102 which may be an Ethernet computer network peripheral device receives and transmits data packets on the network of computers 106 in accordance with standard data communications protocols such as the IEEE 802.3 network standard or the DIX Ethernet standard as is commonly known to one of ordinary skill in the art of Ethernet computer network peripheral device design.

The host computer 104 may be a PC or a workstation, and has a host system which includes a CPU 108 and a shared memory 110 which may be any data storage device found in a PC or a workstation. The CPU 108 further processes a data packet received from the network of computers 106 or generates a data packet to be transmitted on the network of computers 106. The shared memory 110 is shared between the CPU and the computer network peripheral device 102. In a DMA (Direct Memory Access) mode of operation, the computer network peripheral device 102 has direct access to the shared memory 110 within the host system of the computer 104.

When the computer network peripheral device 102 receives a data packet from the network of computers 106, that data packet is written into the shared memory 110 directly by the computer network peripheral device 102 for further processing by the host system CPU 108. The CPU 108 also accesses the shared memory 110 to further process the data packet stored within the shared memory 110.

Alternatively, the CPU 108 accesses the shared memory 110 to write a data packet to be transmitted on the network of computers 106. The computer network peripheral device 102 then accesses the shared memory 110 to read the stored data packet in order to transmit such a data packet over the network of computers 106.

Since both the CPU 108 and the computer network peripheral device 102 access the shared memory 110, such shared access to the shared memory 110 is coordinated between a first device (i. e. the CPU 204) and a second device (i.e. the computer network peripheral device 102) for harmonious interaction between the two devices. A mechanism for keeping track of which part of the shared memory 110 is available to any one electronic device further ensures harmonious interaction.

SUMMARY OF THE INVENTION

Accordingly, a primary object of the present invention is to efficiently keep track of available elements from a shared list of elements that are available to be processed by a given device.

In a general aspect of the present invention, an apparatus and method keeps track of elements, within a list of elements, that are available for processing by a given device from a plurality of entries of an index and count. The index indicates a starting element in the list that is available to the given device for processing, and the count indicates a subsequent number of elements, from the starting element in the list, that are available to the given device for processing. Typically, another device, which shares the list of elements with the given device, provides the entries of index and count to the given device.

In one aspect of the present invention, a first index register has a first cumulative count for indicating a last element down the list that is available to the given device for processing and has a first current element index for indicating a current element in the list that is currently being processed by the given device. The current element through the last element in the list are available to the given device for processing. A second index register has a second cumulative count for indicating the last element down the list that is available to the given device for processing and has a second current element index for indicating the current element in the list that is currently being processed by the given device. The current element through the last element in the list are available to the given device for processing.

An index register switch controls the given device to switch from using the first index register to using the second index register for indicating the last available element when the given device has been using the first index register for indicating the last available element and when the last available element wraps back over a beginning element in the list. The index register switch also controls the given device to switch from using the second index register to using the first index register for indicating the last available element when the given device has been using the second index register for indicating the last available element and when the last available element wraps back over the beginning element in the list.

The index register switch further controls the given device to switch from using the first index register to using the second index register for indicating the current element that is currently being processed when the given device has been using the first index register for indicating the current element and when the current element indicated by the first index register is a very last element in the list. In addition, the index register switch controls the given device to switch from using the second index register to using the first index register for indicating the current element that is currently being processed when the given device has been using the second index register for indicating the current element and when the current element indicated by the second index register is the very last element in the list.

The given device thus alternates back and forth between the two index registers when processing the list of elements and also in keeping track of the last available element in the list of elements. One of the two index registers keeps track of the elements to be processed by the given device in a cycling through of the list of elements, and one of the two index registers is used to keep track of the currently processed element when the given device processes through a cycle of the list of elements.

The present invention can be used to particular advantage when the given device is a computer network peripheral device that couples the host computer system to a network of computers and when the list of elements is a list of elements corresponding to buffers for storing data packets.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Moreover, elements having the same reference number in FIGS. 1–4 refer to elements having similar structure and function.

DETAILED DESCRIPTION

Figure 2:
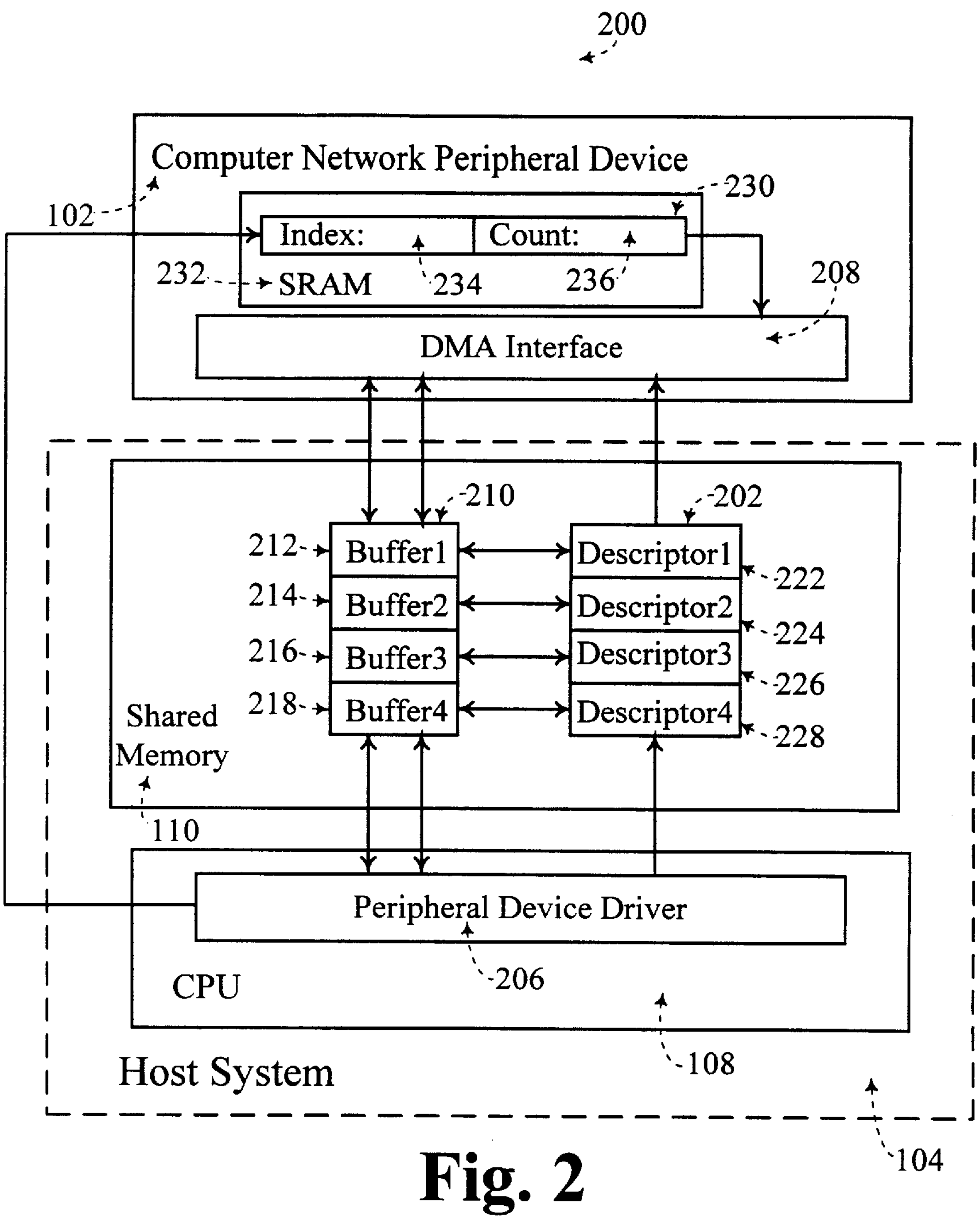
FIG. 2 shows an apparatus that coordinates access to a shared memory by a CPU, within the host computer system, and the computer network peripheral device, using an index and count mechanism.

FIG. 2 shows an apparatus 200 using an index and count mechanism for efficient coordination of access to the shared memory 110 by the computer network peripheral device 102 and the host system CPU 108 as described in a concurrently filed patent application entitled "Using an Index and Count Mechanism to Coordinate Access to a Shared Resource by Interactive Devices" with inventors Ching Yu, John Chiang, and Din-I Tsai, and having a common assignee and the common inventor Ching Yu, with Ser. No. 08/992,148. This patent application in entirety is incorporated herein by reference.

The apparatus 200 includes a list of descriptors 202 for coordinating access to the shared memory 110. The CPU 108 and the shared memory 110 are within the host system of the host computer 104. The CPU 108 includes a peripheral device driver 206 (which may be a software module within the CPU 108) for accessing the shared memory 110 and for otherwise interacting with the computer network peripheral device 102. The computer network peripheral device 102 includes a DMA (Direct Memory Access) interface 208 for accessing the shared memory 110.

Figure 1:
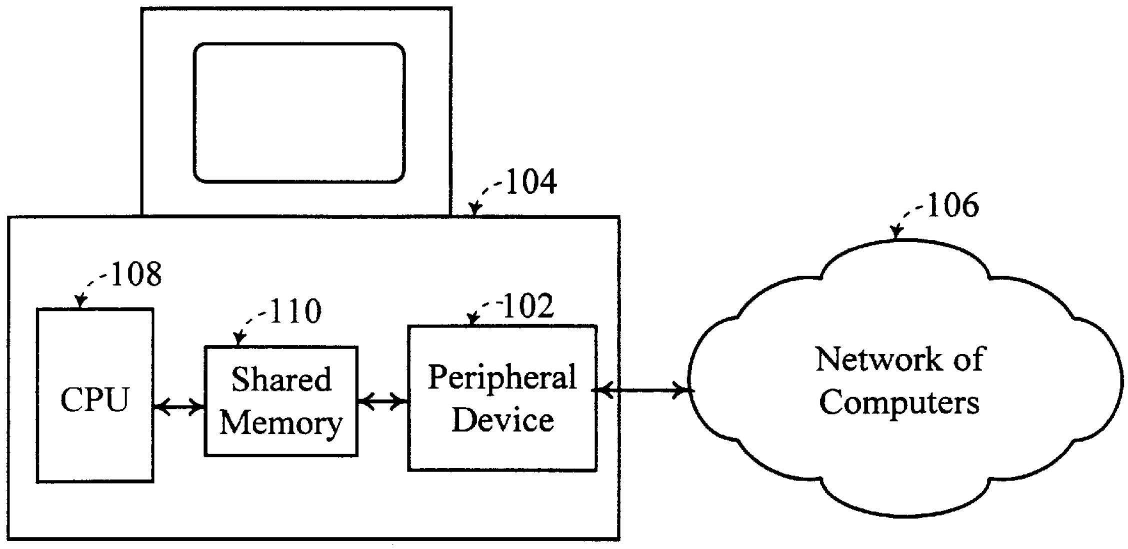
FIG. 1 shows a computer network peripheral device within a host computer that is coupled to a network of computers.

The shared memory 110 includes a plurality of buffers 210 including a first buffer 212, a second buffer 214, a third buffer 216, and a fourth buffer 218. (Note that the shared memory 110 typically has a considerably larger number of buffers, but only four buffers are shown in FIG. 2 for clarity of illustration.) The plurality of buffers 210 stores data packets received or to be transmitted on the network of computers 106 of FIG. 1. For each buffer, a respective descriptor is implemented within the shared memory 110. (However, the present invention may also be practiced with the respective descriptor located within any data storage device outside of the shared memory 110.) Thus, a first descriptor 222 corresponds to the first buffer 212, a second descriptor 224 corresponds to the second buffer 214, a third descriptor 226 corresponds to the third buffer 216, and a fourth descriptor 228 corresponds to the fourth buffer 218.

A respective descriptor contains access information for a corresponding buffer. The access information is written into the descriptor by the peripheral device driver 206. Thus, the entries of access information within descriptors are maintained by the CPU 108 to inform the computer network peripheral device 102 of the state of activity between the CPU 108 and each of the plurality of buffers 210.

The apparatus 200 which uses an index and count mechanism for more efficient coordination of access includes a descriptor queue register 230 within a data storage device such as a SRAM 232 (Static Random Access Memory) of the computer network peripheral device 102. The peripheral device driver 206 updates entries within the descriptor queue register 230. The descriptor queue register 230 comprises an index 234 and a count 236. The peripheral device driver 206 writes an entry in the index 234 for indicating a starting descriptor in the list of descriptors 202 that is available to the computer network peripheral device 102 for access. Additionally, the peripheral device driver 206 writes an entry in the count 236 for indicating a subsequent number of descriptors, from the starting descriptor in the list of descriptors 202, that are available to the computer network peripheral device 102 for access.

The computer network peripheral device 102 processes any descriptors which are indicated as being available by an entry of the index 234 and the count 236. The time between each update to the index 234 and the count 236 however may be shorter than the time for processing any descriptors which are indicated as being available by each entry of the index 234 and the count 236. In that case, a list of a history of the index and count entries may be maintained, but storing the index and count entries in such a list may require added storage space within a data storage device such as the SRAM 232.

Figure 3:
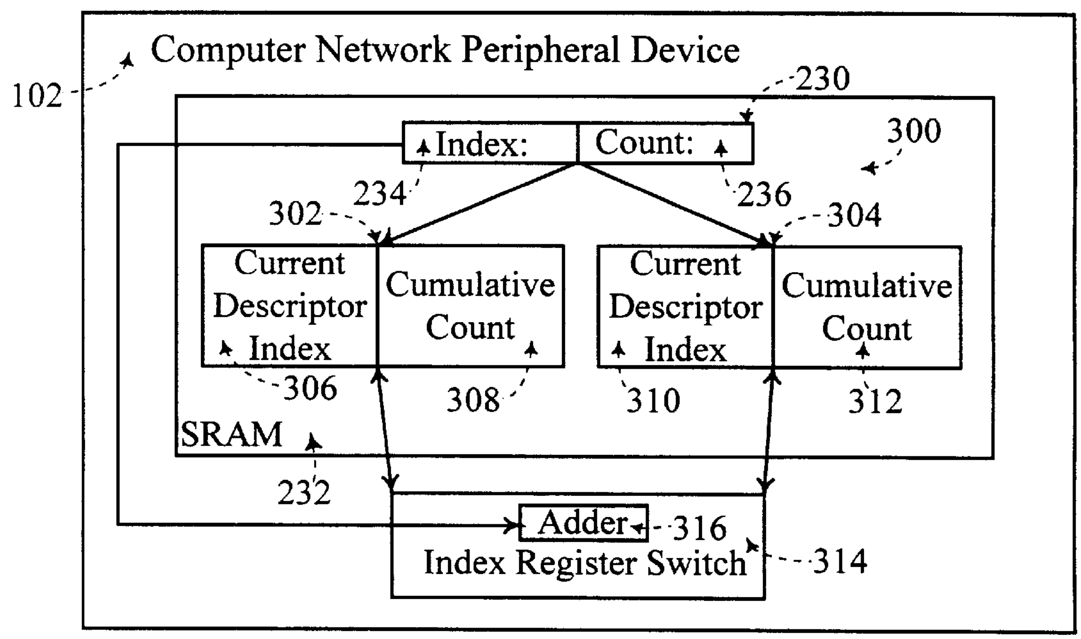
FIG. 3 shows an apparatus of the present invention alternating between using a first index register and a second index register for keeping track of descriptors to be processed, according to a preferred embodiment of the present invention.

Referring to FIGS. 2 and 3, the computer network peripheral device 102 according to a preferred embodiment of the present invention includes an apparatus 300 of the present invention which has a first index register 302 and a second index register 304 operatively coupled to the descriptor queue register 230. The first index register 302 includes a first current descriptor index 306 and a first cumulative count 308. The second index register 304 includes a second current descriptor index 310 and a second cumulative count 312. The first index register 302 and the second index register 304 are disposed within a data storage device such as the SRAM 232 of the computer network peripheral device 102. The first index register 302 and the second index register 304 are coupled to an index register switch 314, including an adder 316, within the computer network peripheral device 102. The index register switch 314 including the adder 316 may be part of a data processing device as is typically used within an Ethernet computer network peripheral device.

The operation of the apparatus 300 according to a preferred embodiment of the present invention is described with reference to FIG. 4 which shows example entries of the index 234 and the count 236 in the descriptor queue register 230. Each entry of the index 234 and the count 236 indicates a respective batch of available descriptors that the computer network peripheral device 102 may access and process. Assume for simplicity of illustration that the list of descriptors 202 has eight descriptors. (However, the present invention may be practiced for any number of descriptors for the list of descriptors 202.)

Figure 4:
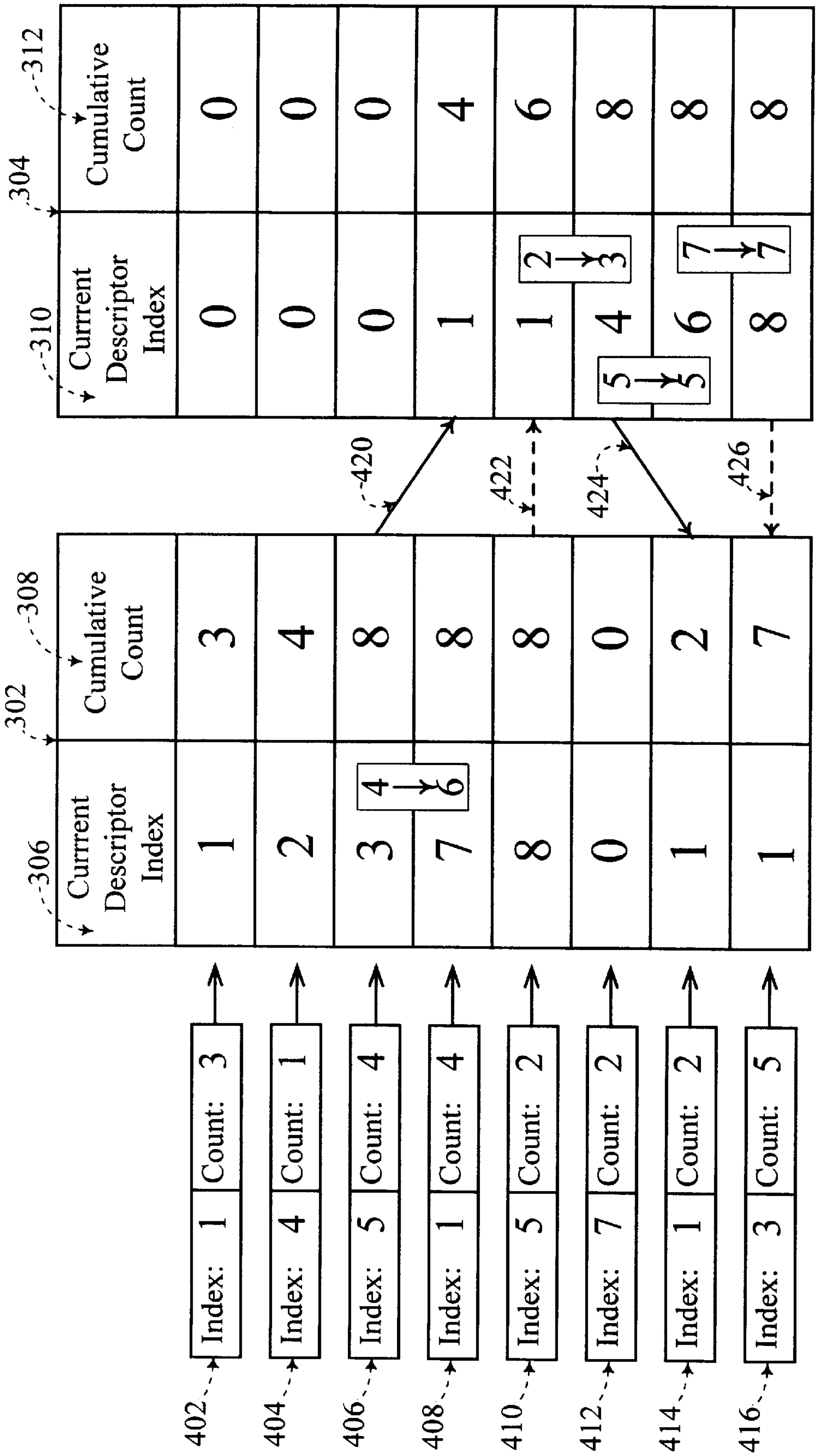
FIG. 4 shows example entries of index and count within the apparatus of FIG. 2 and the corresponding entries within the first and second index registers of FIG. 3, according to a preferred embodiment of the present invention.

For example, referring to FIG. 4, a first descriptor queue register entry 402 has an index of 1 and a count of 3. This entry indicates to the computer network peripheral device 102 that the first descriptor in the list of descriptors 202 is available and that there are a total of 3 descriptors in a batch of descriptors that are available for access. Thus, the subsequent two descriptors after the first descriptor in the list of descriptors 202 are also available to the computer network peripheral device 102 for access.

A second descriptor queue register entry 404 then has an index of 4 and a count of 1. This entry indicates to the computer network peripheral device 102 that the fourth descriptor and no subsequent descriptor from the fourth descriptor is available for access. A third descriptor queue register entry 406 then has an index of 5 and a count of 2. This entry indicates to the computer network peripheral device 102 that the fifth descriptor and the subsequent one descriptor from the fourth descriptor in the list of descriptors 202 are also available for access.

A fourth descriptor queue register entry 408 then has an index back to 1 and a count of 4. This entry indicates to the computer network peripheral device 102 that the first descriptor and the subsequent three descriptors from the first descriptor are also available for access. Thus, the fourth descriptor queue register entry 408 indicates that descriptor access has recycled back to the first descriptor (i.e. the beginning descriptor of the descriptor list 202).

A fifth descriptor queue register entry 410 then has an index of 5 and a count of 2. This entry indicates to the computer network peripheral device 102 that the fifth descriptor and the subsequent one descriptor from the fifth descriptor in the list of descriptors 202 are also available for access. A sixth descriptor queue register entry 412 then has an index of 7 and a count of 2. This entry indicates to the computer network peripheral device 102 that the seventh descriptor and the subsequent one descriptor from the seventh descriptor in the list of descriptors 202 are also available for access.

A seventh descriptor queue register entry 414 then has an index back to 1 and a count of 2. This entry indicates to the computer network peripheral device 102 that the first descriptor and the subsequent one descriptor from the first descriptor are also available for access. Thus, the seventh descriptor queue register entry indicates that descriptor access has recycled back to the first descriptor (i.e., the beginning descriptor of the descriptor list 202). An eighth descriptor queue register entry 416 then has an index of 3 and a count of 5. This entry indicates to the computer network peripheral device 102 that the third descriptor and the subsequent four descriptors from the third descriptor in the list of descriptors 202 are also available for access.

Each of the entries of an index and count 402, 404, 406, 408, 410, 412, 414, and 416 are subsequent entries into the descriptor queue register 230 with time. Each entry of an index and count determines a subsequent batch of descriptors in the list of descriptors 202 available to be accessed and processed by the computer network peripheral device 102.

Upon access of a descriptor, the computer network peripheral device 102 either reads a data packet from a corresponding buffer within shared memory 110 having a data packet for transmission or writes a data packet received from the network of computers 106 into the corresponding buffer. Such processing of a batch of descriptors may take a longer time than the time between updates to the descriptor queue register 230 with a new entry of an index and count. In that case, the first index register 302 and the second index register 304 keep track of the descriptors to be processed as indicated by each entry of an index and count in the descriptor queue register 230.

Referring to FIG. 4, the contents of the first index register 302 and the second index register 304 are shown for each entry of an index and count in the descriptor queue register 230. The computer network peripheral device 102 alternates back and forth between using the two index registers 302 and 304 for processing through a cycle of the list of descriptors 202 of FIG. 2. For simplicity of illustration, assume again that the list of descriptors 202 has eight descriptors within the list of descriptors 202. (However, the present invention may be practiced for any number of descriptors for the list of descriptors 202.)

Also, for the first descriptor queue register entry 402, assume that initially the first index register 302 is being used for keeping track of processing the list of descriptors 202. The first current descriptor index 306 indicates a current processed descriptor in the list of descriptors 202 that is currently being processed by the computer network peripheral device 102.

The first cumulative count 308 indicates a last available descriptor in the list of descriptors 202 to be processed by the computer network peripheral device 102. The first cumulative count 308 is determined from each entry of the count in the descriptor queue register 230, and is initially equal to the count of 3 as in the first descriptor queue register entry 402. The first cumulative count 308 indicates how far down the list of descriptors 202 a descriptor is available to the computer network peripheral device 102.

Initially, assume also that the first index register 302 is being used for keeping track of the current processed descriptor. Then, the initial entries for the second current descriptor index 310 and the second cumulative count 312 of the second index register 304 are zero. The first current descriptor index 306 is a 1 at the first descriptor queue entry 402 indicating that the computer network peripheral device 102 is currently processing the first descriptor (i.e., the beginning descriptor) in the list of descriptors 202.

At the second descriptor queue register entry 404, the first cumulative count 308 is incremented with the count of 1 by the adder 316 of FIG. 3. Thus, the first cumulative count 308 is updated to a 4. The first current descriptor index 306 is now 2 indicating that the computer network peripheral device 102 is currently processing the second descriptor in the list of descriptors 202.

At the third descriptor queue register entry 406, the first cumulative count 308 is incremented with the count of 4 by the adder 316 of FIG. 3. Thus, the first cumulative count 308 is updated to an 8. The first current descriptor index 306 is now 3 indicating that the computer network peripheral device 102 is currently processing the third descriptor in the list of descriptors 202.

At this point, the first cumulative count 308 of the first index register 302 indicates a very last descriptor (i.e., the eighth descriptor for the example list of eight descriptors) as the last available descriptor in the list of descriptors 202. Under this condition, the adder 316 of the index register switch 314 begins to increment the second cumulative count 312 of the second index register 304 at the next entry of the descriptor queue register 230 as indicated by a first switch line 420. The first cumulative count 308 indicates the very last descriptor as the last available descriptor especially when a subsequent entry of the index 234 in the descriptor queue register 230 is back to a 1. At the next entry of the descriptor queue register, the last available descriptor wraps back over the beginning descriptor (i.e. the first descriptor in the list of descriptors), and thus the given device switches to using the second index register 304 for keeping track of the last available descriptor.

Thus, at the fourth descriptor queue register entry 408, the index entry is a 1. The second cumulative count 312 is incremented with the count of 4 by the adder 316 of FIG. 3. Thus, the second cumulative count 312 is updated to 4. The second current descriptor index 310 is updated to 1 indicating that the computer network peripheral device 102 is to begin processing the first descriptor in the list of descriptors 202 when the computer network peripheral device 102 begins to use the second index register 304 for keeping track of the currently processed descriptor.

At this point, however, note that the first current descriptor index 306 is a 7 indicating that the seventh descriptor in the list of eight descriptors 202 is currently being processed. (Note, that the fourth through the sixth descriptors have already been processed by the computer network peripheral device between the third descriptor queue register entry 406 and the fourth descriptor queue register entry 408.) Thus far, the first through the seventh descriptors in the example list of eight descriptors have been processed. The computer network peripheral device 102 continues to process the list of descriptors 202 using the first index register 302 until the whole list of eight descriptors 202 are processed using the first index register 302. The adder 316 updates the first current descriptor index 306 by one for each processing of a descriptor.

At the fifth descriptor queue register entry 410, the second cumulative count 312 is incremented with the count of 2 by the adder 316 of FIG. 3. Thus, the second cumulative count 312 is updated to 6. The second current descriptor index 310 is still 1 because the computer network peripheral device 102 has not switched to using the second register index 304 for keeping track of the currently processed descriptor.

At this point, the first current descriptor index 306 has reached 8 indicating that the first through the very last descriptor (i.e. the eighth descriptor in the example list of eight descriptors) has been processed by the computer network peripheral device 102 using the first index register 302. This condition holds when the first current descriptor index 306 is equal to the first cumulative count 308 and when the second current descriptor index 310 is a 1 indicating that the second index register 304 is ready to be used for keeping track of the currently processed descriptor. Under this condition, the index register switch 314 controls the computer network peripheral device 102 to switch to using the second index register 304 for keeping track of the currently processed descriptor as indicated by a second switch line 422. Thus, the adder 316 of index register switch 314 begins to increment the second current descriptor index 310 of the second index register 304 for each subsequent processing of a descriptor.

At the sixth descriptor queue register entry 412, the second cumulative count 312 is incremented with the count of 2 by the adder 316 of FIG. 3. Thus, the second cumulative count 312 is updated to 8. The second current descriptor index 310 is now 4 indicating that the computer network peripheral device 102 is currently processing the fourth descriptor in the list of descriptors 202. (Note, that the second through the third descriptors have already been processed by the computer network peripheral device between the fifth descriptor queue register entry 410 and the sixth descriptor queue register entry 412.)

At this point, the second cumulative count 312 of the second index register 304 indicates the very last descriptor (i.e. the eighth descriptor in the example list of eight descriptors) as the last available descriptor in the list of descriptors 202. Under this condition, the adder 316 of index register switch 314 switches to increment the first cumulative count 308 of the first index register 302 at the next entry of the descriptor queue register 230 as indicated by a fourth switch line 424. The first cumulative count 308 indicates the very last descriptor as the last available descriptor when a subsequent entry of the index 234 in the descriptor queue register 230 is back to a 1. At the next entry of the descriptor queue register, the last available descriptor wraps back over the beginning descriptor (i.e. the first descriptor in the list of descriptors), and thus the given device switches back to using the first index register 302 for keeping track of the last available descriptor.

Thus, at the seventh descriptor queue register entry 414, the index 234 is back to a 1. The first cumulative count 308 is incremented with the count of 2 by the adder 316 of FIG. 3. Thus, the first cumulative count 308 is updated to 2. The first current descriptor index 306 is updated to 1 indicating that the computer network peripheral device 102 is to begin processing the first descriptor in the list of descriptors 202 when the computer network peripheral device 102 switches to using the first index register 302 from using the second index register 304 for keeping track of the currently processed descriptor.

At this point, the second current descriptor index 310 is a 6 indicating that the sixth descriptor in the list of 8 descriptors is currently being processed. (Note, that the fifth descriptor has already been processed by the computer network peripheral device between the sixth descriptor queue register entry 412 and the seventh descriptor queue register entry 414.) The computer network peripheral device 102 continues to process the list of descriptors 202 using the second index register 304 until the very last descriptor (i.e. the eighth descriptor in the example list of eight descriptors) has been processed using the second index register 304. The adder 316 updates the second current descriptor index 310 by one for each processing of a descriptor.

At the eighth descriptor queue register entry 416, the first cumulative count 308 is incremented with the count of 5 by the adder 316 of FIG. 3. Thus, the first cumulative count 308 is updated to 7. The first current descriptor index is still 1 because the computer network peripheral device 102 has not yet switched to using the first register index 302 for keeping track of the currently processed descriptor.

At this point, the second current descriptor index 310 has reached 8 indicating that the very last descriptor (i.e. the eighth descriptor in the example list of eight descriptors) has been processed by the computer network peripheral device 102 using the second index register 304. (Note, that the seventh descriptor has already been processed by the computer network peripheral device between the seventh descriptor queue register entry 414 and the eighth descriptor queue register entry 416.)

The very last descriptor has been processed using the second index register 304 when the second current descriptor index 310 is equal to the second cumulative count 312 and when the first current descriptor index 306 is a 1 indicating that the first index register 302 is ready to be used for keeping track of the currently processed descriptor. Under this condition, the index register switch 314 controls the computer network peripheral device 102 to switch back to keeping track of the currently processed descriptor using the first index register 302 as indicated by a fourth switch line 426. Thus, the adder 316 of index register switch 314 now begins to increment the first current descriptor index 306 of the first index register 302 for each subsequent processing of a descriptor.

In this manner, the first index register 302 and the second index register 304 are alternately used for keeping track of the last available descriptor in the list of descriptors 210 to be processed by the computer peripheral device 102. In addition, the first index register 302 and the second index register 304 alternately keep track of the currently processed descriptor in the list of descriptors 210. The time for processing any available descriptors may be longer than the time for updating an entry into the descriptor queue register 230 to indicate a subsequent batch of descriptors that are available for processing. Thus, two index registers 302 and 304 are used as described herein to allow for a lag in the currently processed descriptor from the last available descriptor that is to be processed by the computer network peripheral device 102.

Using the two registers 302 and 304 in this manner provides a simple and efficient way for keeping track of processing the list of descriptors from the index and count mechanism for coordinating access to the shared memory 110. In the case the time for processing any available descriptors may be longer than the time for updating an entry into the descriptor queue register 230, the two registers 302 and 304 take up relatively little memory space within a data storage device such as the SRAM 232 compared to the memory space that may be required to keep a history list of each entry of index and count in the descriptor queue register 230.

The foregoing is by way of example only and is not intended to be limiting. For example, the present invention may be practiced with any number of descriptors in the list of descriptors 202 within the shared memory 110. More importantly, the data processing tracker of the present invention may be used for keeping track of processing data within any type of shared resource (aside from just the example of the shared memory 110) that is shared between any type of interactive electronic devices (aside from just the example of the CPU 108 and the computer network peripheral device 102) when an index and count mechanism is used for coordination of access to the shared resource. In addition, the present invention may be practiced for any list of elements aside from just the example of the list of descriptors 202. Furthermore, the beginning descriptor and the very last descriptor in the list of descriptors may be any respective descriptor in the list of descriptors and not just the example of the descriptor having the index of “1” and “8” respectively for the beginning and very last descriptor. The invention is limited only as defined in the following claims and equivalents thereof.

I claim:

1. An apparatus for keeping track of elements, within a list of elements, that are available for processing by a given device from a plurality of entries of an index and count, the index indicating a starting element in the list that is available to the given device for processing and the count indicating a subsequent number of elements, from the starting element in the list, that are available to the given device for processing, the apparatus comprising:

a first index register having a first cumulative count for indicating a last element down the list that is available to the given device for processing and having a first current element index for indicating a current element in the list that is currently being processed by the given device, the current element through the last element in the list being available to the given device for processing;

a second index register having a second cumulative count for indicating the last element down the list that is available to the given device for processing and having a second current element index for indicating the current element in the list that is currently being processed by the given device, the current element through the last element in the list being available to the given device for processing; and an index register switch for controlling the given device to switch from using the first index register to using the second index register for indicating the last available element when the given device has been using the first index register for indicating the last available element and when the last available element wraps back over a beginning element in the list, wherein the index register switch controls the given device to switch from using the second index register to using the first index register for indicating the last available element when the given device has been using the second index register for indicating the last available element and when the last available element wraps back over the beginning element in the list, wherein the index register switch controls the given device to switch from using the first index register to using the second index register for indicating the current element that is currently being processed when the given device has been using the first index register for indicating the current element and when the current element indicated by the first index register is a very last element in the list, and wherein the index register switch controls the given device to switch from using the second index register to using the first index register for indicating the current element that is currently being processed when the given device has been using the second index register for indicating the current element and when the current element indicated by the second index register is the very last element in the list.

2. The apparatus of claim 1, wherein the register index switch further includes:

an adder for incrementing the first cumulative count with each entry of the count until a subsequent entry of the index is back to the beginning element in the list when the adder switches to incrementing the second cumulative count of the second index register, wherein the adder increments the second cumulative count with each entry of the count until a subsequent entry of the index is back to the beginning element in the list of elements when the adder switches to incrementing the first cumulative count of the first index register, wherein the given device processes elements in the list using the first index register with an increment to the first current element index with each processing of an element until the first current element index is equal to the first cumulative count and until the second current element index indicates the beginning element in the list, when the given device switches to processing elements using the second index register, and wherein the given device processes elements using the second index register with an update to the second current element index with each processing of an element until the second current element index is equal to the second cumulative count and until the first current element index indicates the beginning element in the list, when the given device switches to processing elements using the first index register.

3. The apparatus of claim 2, wherein the given device is a computer network peripheral device that couples a host computer system to a network of computers, and wherein the list of elements is a list of descriptors corresponding to buffer for storing data packets.

4. The apparatus of claim 3, wherein the host computer system writes each of the plurality of entries of index and count into a descriptor queue register.

5. The apparatus of claim 3, wherein the computer network peripheral device processes a descriptor for writing a data packet received from the network of computers, and wherein the index and the count determine a batch of descriptors corresponding to at least one respective buffer for receiving the data packet.

6. The apparatus of claim 3, wherein the computer network peripheral device processes a descriptor for reading a data packet to be transmitted to the network of computers, and wherein the index and the count determine a batch of descriptors corresponding to at least one buffer having the data packet to be transmitted to the network of computers.

7. An apparatus for keeping track of elements, within a list of elements, that are available for processing by a given device from a plurality of entries of an index and count, the index indicating a starting element in the list that is available to the given device for processing and the count indicating a subsequent number of elements, from the starting element in the list, that are available to the given device for processing, the apparatus comprising:

means for indicating a last element down the list that is available to the given device for processing and for indicating a current element in the list that is currently being processed by the given device, at a first index register, the current element through the last element in the list being available to the given device for processing;

means for indicating the last element down the list that is available to the given device for processing and for indicating the current element in the list that is currently being processed by the given device, at a second index register, the current element through the last element in the list being available to the given device for processing; and means for controlling the given device to switch from using the first index register to using the second index register for indicating the last available element when the given device has been using the first index register for indicating the last available element and when the last available element wraps back over a beginning element in the list, and for controlling the given device to switch from using the second index register to using the first index register for indicating the last available element when the given device has been using the second index register for indicating the last available element and when the last available element wraps back over the beginning element in the list, and for controlling the given device to switch from using the first index register to using the second index register for indicating the current element that is currently being processed when the given device has been using the first index register for indicating the current element and when the current element indicated by the first index register is a very last element in the list, and for controlling the given device to switch from using the second index register to using the first index register for indicating the current element that is currently being processed when the given device has been using the second index register for indicating the current element and when the current element indicated by the second index register is the very last element in the list.

8. The apparatus of claim 7, wherein the given device is a computer network peripheral device that couples a host computer system to a network of computers, and wherein the list of elements is a list of descriptors corresponding to buffers for storing data packets.

9. A method for keeping track of elements, within a list of elements, that are available for processing by a given device from a plurality of entries of an index and count, the index indicating a starting element in the list that is available to the given device for processing and the count indicating a subsequent number of elements, from the starting element in the list, that are available to the given device for processing, the method including the steps of:

keeping track of a last element down the list that is available to the given device for processing and a current element in the list that is currently being processed by the given device, at a first register index, the current element through the last element in the list being available to the given device for processing;

keeping track of the last element and the current element, at a second index register;

controlling the given device to switch from using the first index register to using the second index register for keeping track of the last available element when the given device has been using the first index register for keeping track of the last available element and when the last available element wraps back over a beginning element in the list;

controlling the given device to switch from using the second index register to using the first index register for keeping track of the last available element when the given device has been using the second index register for keeping track of the last available element and when the last available element wraps back over the beginning element in the list;

controlling the given device to switch from using the first index register to using the second index register for keeping track of the current element that is currently being processed when the given device has been using the first index register for keeping track of the current element and when the current element kept track of by the first index register is a very last element in the list; and controlling the given device to switch from using the second index register to using the first index register for keeping track of the current element that is currently being processed when the given device has been using the second index register for keeping track of the current element and when the current element kept track of by the second index register is the very last element in the list.

10. The method of claim 9, wherein the given device is a computer network peripheral device that couples a host computer system to a network of computers, and wherein the list of elements is a list of descriptors corresponding to buffers for storing data packets.

11. The method of claim 10, wherein the computer network peripheral device processes a descriptor for writing a data packet received from the network of computers, and wherein the index and the count determine a batch of descriptors corresponding to at least one respective buffer for receiving the data packet.

12. The method of claim 10, wherein the computer network peripheral device processes a descriptor for reading a data packet to be transmitted to the network of computers, and wherein the index and the count determine a batch of descriptors corresponding to at least one respective buffer having the data packet to be transmitted to the network of computers.

* * * * *